United States Patent [19]

Sekiya

[11] Patent Number: 5,682,547

[45] Date of Patent: Oct. 28, 1997

[54] STATUS MANAGEMENT AND DATA TRANSMISSION IN A SYSTEM COMPRISING PERIPHERALS AND A CONTROLLER THEREOF

[75] Inventor: Makoto Sekiya, Toyokawa, Japan

[73] Assignee: Minolta Co., Ltd., Osaka, Japan

[21] Appl. No.: 312,994

[22] Filed: Sep. 27, 1994

[30] Foreign Application Priority Data

Sep. 29, 1993 [JP] Japan ................................. 5-242621

[51] Int. Cl.⁶ ........................................................ G06F 13/10
[52] U.S. Cl. ................... 395/821; 395/412; 395/731; 395/882; 364/710.13; 364/717.5; 364/DIG. 1
[58] Field of Search ........................ 395/275, 200.01, 395/800, 821, 412, 731, 882; 364/DIG. 1, 710.13, 717.5

[56] References Cited

U.S. PATENT DOCUMENTS

| 4,698,628 | 10/1987 | Herkert et al. | 340/825.02 |
| 4,763,329 | 8/1988 | Green | 371/11 |
| 4,801,934 | 1/1989 | Herkert | 340/825.02 |
| 4,989,163 | 1/1991 | Kawamata et al. | 364/519 |
| 5,167,011 | 11/1992 | Priest | 395/54 |
| 5,257,289 | 10/1993 | Jopson | 373/36 |

FOREIGN PATENT DOCUMENTS

B4-45871  11/1983  Japan .

*Primary Examiner*—Alyssa H. Bowler
*Assistant Examiner*—Dzung C. Nguyen
*Attorney, Agent, or Firm*—Sidley & Austin

[57] ABSTRACT

In a system including a controller and peripherals connected to the controller, a plurality of statuses represents states of each of the peripherals. Most general statuses useful for controlling the peripheral are taken as statuses in a highest layer of a tree structure, and it is branched to statuses of lower layers successively. When a signal of a certain status, which has no lower statuses which branches further therefrom, signals of the statuses between the certain status and the most general status relevant to the certain status are changed successively. Simultaneously, the information of the statuses on which the signals are changed is transmitted to a controller. Thus, the status information can be transmitted surely to the controller.

14 Claims, 7 Drawing Sheets

STATUS MANAGEMENT AND DATA TRANSMISSION IN A SYSTEM COMPRISING PERIPHERALS AND A CONTROLLER THEREOF

BACKGROUND OF THE INVENTION

1. Field of the Invention

The present invention relates to a system comprising one or more peripherals and a controller connected to the peripherals, and in particular to status management of the peripherals including a method of data transmission between the peripherals and the controller.

2. Description of the Prior Art

In a system including a controller and peripherals, the controller controls the operation of the peripherals generally. In order to control the operation of the peripherals, the controller needs to check the current states in the peripherals. If a peripheral is a laser printer, the states of the peripheral such as "no paper", "no toner" and "jam" are represented as bi-level signals. Each of these states is called as status, and the peripherals store status signals of "1" or "0".

Figure 1:
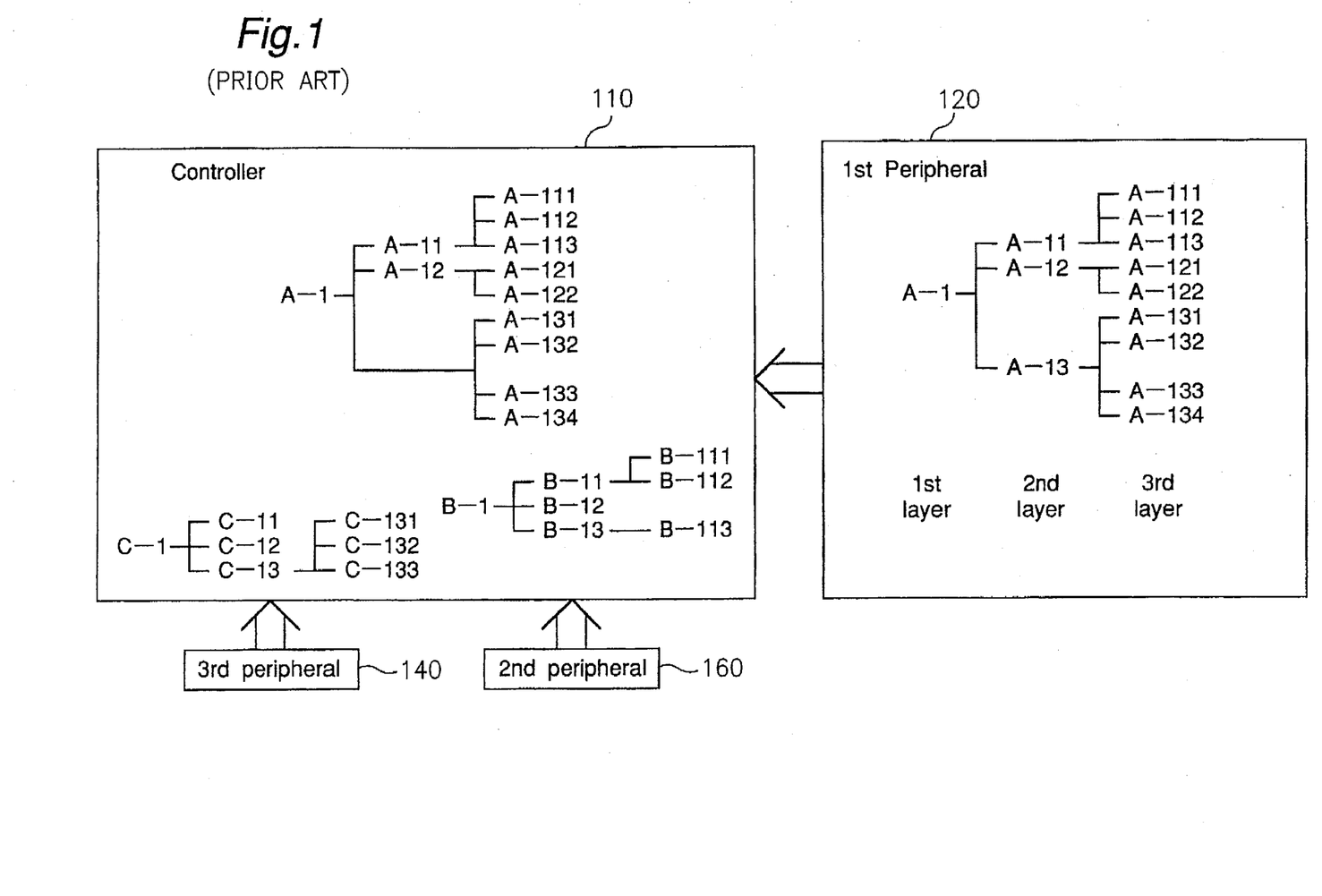
FIG. 1 is a diagram of a controller and three peripherals and statuses in tree structures.

FIG. 1 shows a system including a controller 110 and three peripherals 120, 140 and 160 connected to the controller 110. Further, FIG. 1 shows a directed tree structure on the first peripheral 120, while the controller 110 stores all status signals received from the peripherals 120, 140 and 160.

In the directed tree structure on the first peripheral 120 shown inside a block thereof in FIG. 1, a most comprehensive status "A-1" is located in a first layer. Next, three statuses "A-11" "A-12" and "A-13" branched from "A-1" are located in a second layer Then, three statuses "A-111" "A-112" and "A-113" are branched from "A-11" in a third layer. Similarly, two statuses "A-121" and "A-122" are branched from "A-12" and four statuses "A-131" "A-132" "A-133" and "A-134" are branched from "A-13". Statuses such as "A-111", from which there are no branch statuses, correspond to sensors provided in the peripheral 120. For example, if an output of a sensor in correspondence to the status "A-111" is changed from "0" to "1", the peripheral 120 rewrites the status signal for the status from "0" to "1". It is to be noted that there is only one path from a status from which no statuses branch to the root "A-1". Then, the peripheral further rewrites the status signals of the statuses "A-11" and "A-1" successively.

Previously, data transmission on the statuses in the peripheral 120 by the peripheral 120 to the controller 110 is started after the status signal of the status "A-1" in the first layer is rewritten. The peripheral 120 transmits to the controller 110 that the status signal of the status "A-1" in the first layer is rewritten. Then, it checks the statuses in the second layer and transmits to the controller 110 that the status signal of the status "A-11" in the second layer is rewritten. Finally, it checks the statuses in the third layer and transmits to the controller 110 that the status signal of the status "A-111" in the third layer is rewritten. As explained above, the peripheral 120 checks the values of status signals of statuses from the first layer to lower layers successively so as to transmit information on all the rewritten statuses to the controller 110.

As shown in FIG. 1, the controller 110 stores all status signals received from the peripheral 120. When the controller 110 receives the status data of the status "A-1", it rewrites the value of the status signal of the status "A-1" from "0" to "1". When the controller 110 receives the status data of the status "A-11", it rewrites the value of the status signal of the status "A-11" from "0" to "1". Finally, when the controller 110 receives the status data of the status "A-111", it rewrites the value of the status signal of the status "A-111" from "0" to "1".

In the system explained above, transmission interval of status signals from the peripherals 120–160 to the controller 110 varies with the number of the statuses located in a path in the tree structure and the operation situation of the peripheral such as interrupt. Therefore, the controller 110 cannot decide when data transmission from the peripheral is completed. Then, the controller may not recognize the status data correctly. For example, when the status data of "A-1" is received, the controller 110 first checks the status in the first layer because of the efficiency of search. Then, it checks the status of the second layer. However, it may happen that the status information on the second layer has not yet been received at that time.

SUMMARY OF THE INVENTION

An object of the present invention is to provide a status management system and a status management method wherein a peripheral can transmit changes of status signals to a controller thereof more correctly.

In a system including a controller and peripherals connected to the controller, a plurality of statuses represents states of each of the peripherals and they are used to control the operation of the peripherals. Most general statuses useful for controlling each peripheral are taken as statuses in a highest layer of a tree structure, and they are branched to statuses of lower layers successively. When a signal of a certain status which has no lower statuses which branches further therefrom, signals of statuses between the certain status to a most general status relevant to the certain status are changed successively. Simultaneously, the information of the statuses on which the signals are changed is transmitted successively to a controller from a status in the lowest layer among the changed statuses. Thus, the status information can be transmitted surely from the peripheral to the controller.

An advantage of the present invention is that the controller can grasp the states of the peripherals surely.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 2:
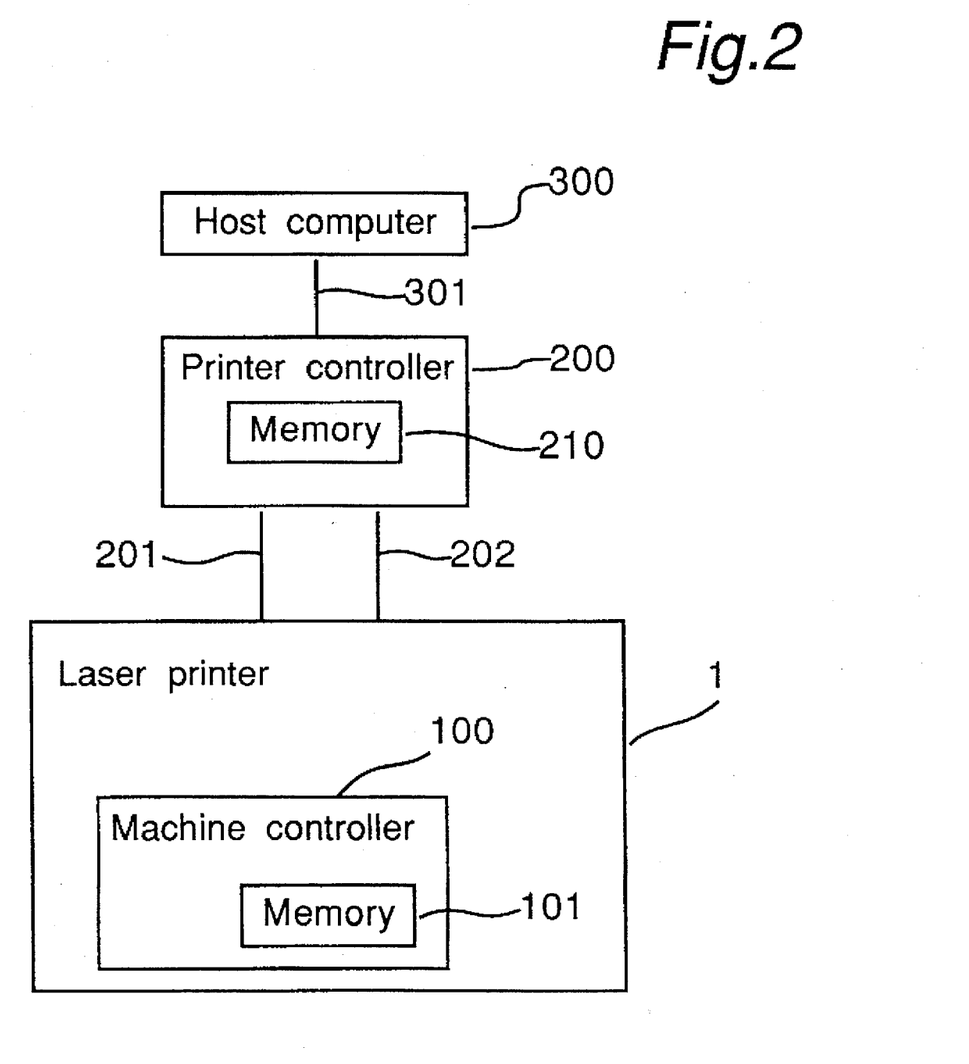
FIG. 2 is a block diagram of a host computer, a printer controller and a laser printer.

Referring now to the drawings, wherein like reference characters designate like or corresponding parts throughout the several views, FIG. 2 shows a system of an embodiment of the invention including a printer controller 200 as a controller of the invention and a laser printer 1 as a peripheral of the invention. The printer controller 200 can control a plurality of peripherals including the laser printer 1. However, only the laser printer 1 is illustrated in FIG. 2 for the convenience of explanation.

The printer controller 200 generates bit map data according to signals received from a host computer 300 and transmits the data to the laser printer 1, while it also determines print format and controls the laser printer 1. The printer controller 200 has a memory 210 for managing the status signals of all statuses of the laser printer 1. The values of status signals stored in the memory 210 are rewritten according to status information transmitted from the laser printer 1 so as to keep them the same as those of the status signals stored in the laser printer 1. When the laser printer 1 is controlled, the status signals stored in the memory 210 are checked by a predetermined process to grasp the situation of the laser printer 1.

The laser printer 1 is controlled by a machine controller 100 including a memory 101. The states of the laser printer 1 are represented as a tree structure of statuses explained below with reference to FIG. 4, and the memory 101 stores the status signals.

A host interface 301 is provided between the host computer 300 and the printer controller 200, while two kinds of communication media are provided between the printer controller 200 and the laser printer 1: an image interface 201 for transmitting bit map data from the printer controller 200 to the laser printer 1 and a control interface 202 for exchanging the information between the printer controller 200 and the laser printer 1 for print control. The control interface 202 is a bi-directional serial interface which can send and receive data in the unit of one byte (or eight bits).

Figure 3:
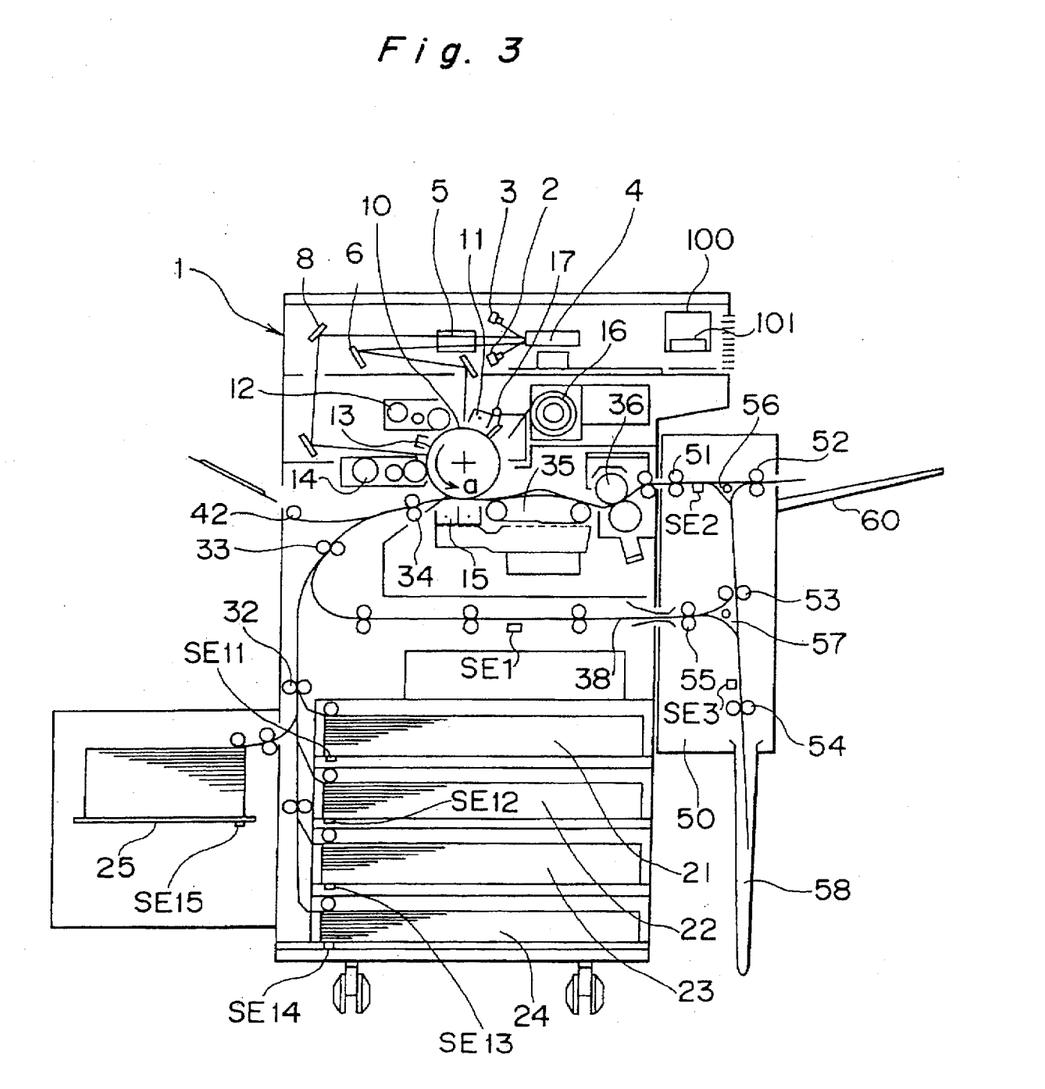
FIG. 3 is a sectional view of a laser printer.

FIG. 3 shows the laser printer 1 which can print an image of two colors. The laser printer 1 has the machine controller 100 which has the memory 101 for storing status signals of all the statuses and manages each status of the laser printer 1. The laser printer 1 performs print operation according to information received from the printer controller 200.

The laser printer 1 has a photoconductor drum 10, and a first sensitizing charger 11, a first development unit 12 of a first color, a second sensitizing charger 13, a second development unit 14 of a second color, a charger 15 for separating a sheet of paper, a cleaning unit 16 for removing remained toners, and an eraser lamp 17 for discharging remained charges. Image data received from the host computer 300 or the like through the printer controller 200 are subjected to a data processing to modulate optical intensities of a beam emitted by first or second laser device 2, 3. The laser beam emitted from the first laser device 2 is moved by a beam scan system 4 and propagates through an f-θ lens 5 and a mirror 6 to the photoconductor drum 10 which has been sensitized by the first charger 11. Thus, a first electrostatic latent image is formed on the photoconductor drum 10. The first development unit 12 develops the latent image with toners of the first color. Further, the laser beam emitted from the second laser device 3 is moved by the beam scan system 4 and propagates through the f-θ lens 5 and the mirror 8 to the photoconductor drum 10 which has been sensitized by the second charger 12. Thus, a second electrostatic latent image is formed on the photoconductor drum 10 and the second development unit 14 develops the latent image with toners of the second color.

Cassettes 21, 22, 23 and 24 for automatic paper feed are provided at a bottom portion of the laser printer 1 and a cassette 25 of an elevator type is provided at a side of a cabinet of the laser printer 1 as an option. The sizes and numbers of sheets of paper stored in the cassettes 21–25 are sensed by sensors SE11–SE15. A sheet of paper stored in the cassettes 21–25 is fed automatically by rollers 32 and 33 to a timing roller 34 and held there, or a sheet of paper is supplied by hand through a roller 42 to the timing roller 34. The sheet of paper is supplied further to the photoconductor drum 10 in synchronization with the formation of the toner image, and the charger 15 transfers the toner image to the sheet of paper. The paper is carried by a carriage belt 35 to a fixing unit 36 for fixing the toner image.

A reversal unit 50 comprises receive rollers 51, discharge rollers 52, reversal rollers 53, 54 and a switch-back path 58. Claws 56 and 57 can take one of two positions according to a selected mode. The reversal unit 50 is used with the claw 56 to receive a sheet of paper in the switch-back path 58 with the roller 51, 54 and to discharge the sheet of paper with the rollers 53, 54 to a tray 60 with its face down (non-reversal mode). It is also used to discharge a sheet of paper directly with the rollers 51, 52 to the tray 60 with its face up (reversal mode). It is further used with the claw 57 to send the sheet of paper to a re-feed path 38 for two print modes for printing images on two faces of the sheet (two-face print mode) and for printing a further image to form a synthesized image (synthesis print mode). In the two-face print mode, a sheet of paper is first carried to the switch-back path 58 and guided to the re-feed path 38 with the rollers 54, 55 and the claw 57. In the synthesis print mode, a sheet of paper is guided to the re-feed path 38 with the rollers 53, 55 and the claw 57 without reversing it.

The laser printer 1 has many sensors in order to grasp the operation condition to control the operation. It has the sensors SE11–SE15, as explained above, to check remaining sheets of paper in the cassettes 21–25. It has sensors (not shown) for checking toners remaining in the first and second development units 12, 14. In the re-feed path 38, three sensors SE1–SE3 are provided to determine a position of paper jam. Further, though not shown, there are provided three sensors for checking the openness of doors, three sensors for checking wear of components, sensors for checking errors of the first and second sensitizing chargers 11, 13, and the like.

Figure 4:
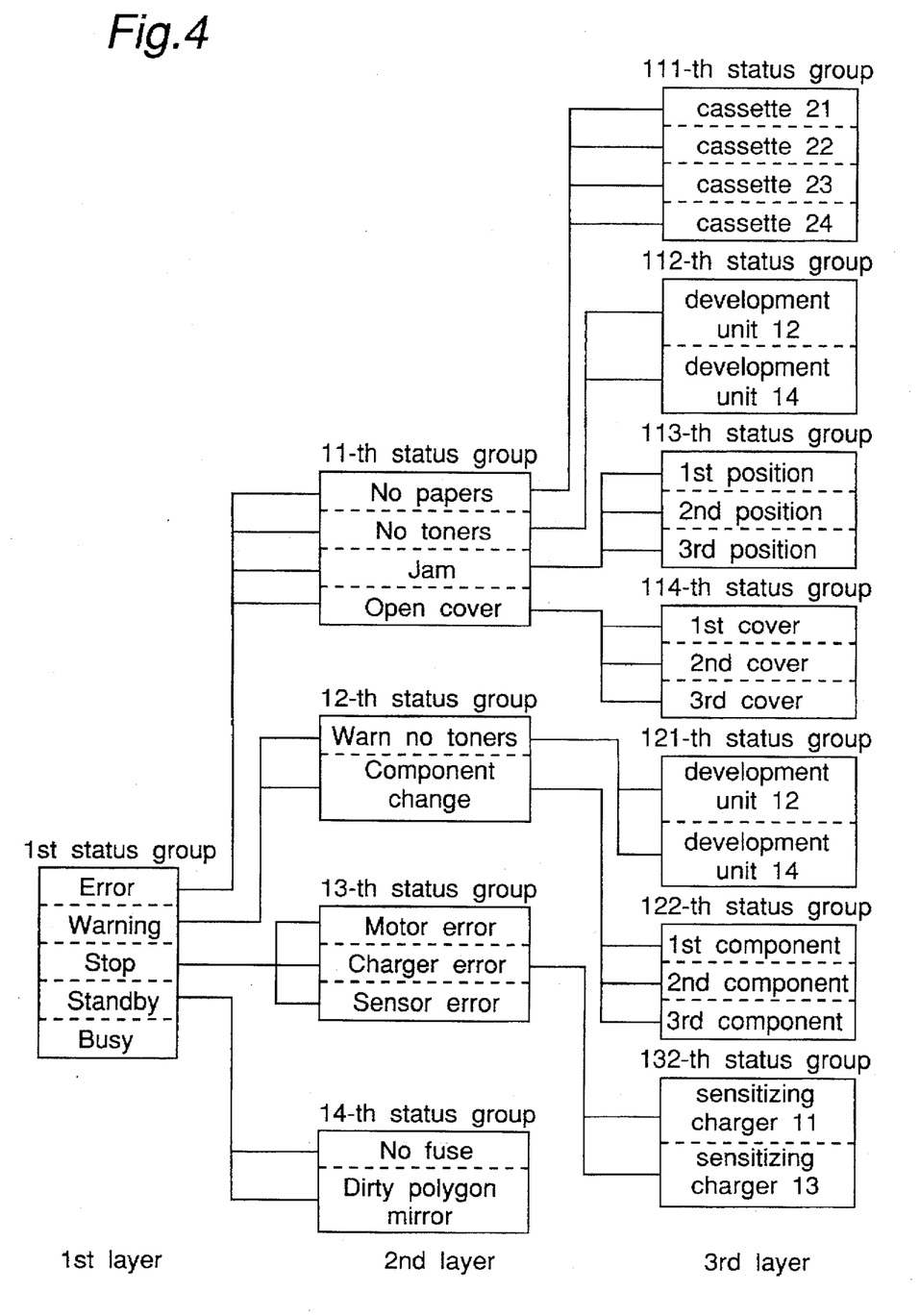
FIG. 4 is a diagram of statuses in a three-layer tree structure.

The output signals of these sensors and the like correspond to statuses from which no statuses branch in a tree structure as shown in FIG. 4. The machine controller 100 manages the changes of the sensors between print operations. Usually, the status is set as "1" in a situation where there is no need to communicate with the printer controller 200. When it recognizes a change of a sensor output signal, a status signal of a status in correspondence to the sensor is changed from "1" to "0" or from "0" to "1", and it transmits the information on the status to the printer controller 200.

FIG. 4 shows all statuses classified as a directed tree structure consisting of three layers of the laser printer 1. As mentioned above, the status signals for the statuses are stored in the memory 101 provided in the machine controller 100.

As shown in FIG. 4, five comprehensive statuses belongs to a first status group in a first or highest layer: "Error" status for representing states such as occurrence of no paper in a cassette and the like, "warning" status for representing states to be warned such as occurrence of no toners in a development unit, "stop" status for representing states such as motor error to stop the printer operation, "standby" status for representing states such as no fuse to bring the laser printer 1 to a standby state, and "busy" status for representing states that the laser printer 1 is under print operation. These statuses in the first status group represent the most comprehensive states to be managed by the machine controller 100 and the printer controller 200. The tree structures shown in FIG. 1 has only one status in the first layer for the simplicity of explanation. However, in general, the number of statuses in the first layer, or the most comprehensive states, is larger than one.

Four of the five statuses in the first status group in the first layer are branched to statuses in a second layer. For example, the error status in the first layer branches to four statuses in an 11-th status group in a second layer: "No papers" for representing states that there are no papers in one of the cassettes 21–24, "no toners" for representing states that no toners exist in one of the development units 12, 14, "jam" for representing states that a sheet of paper is not carried normally and "open cover" for representing states that covers are open.

Similarly, a status in the first layer branches to statuses in the second layer. The warning status branches to statuses of "warn no toners" and "component change" in an 11-th status group. The stop status branches to statuses of "motor error" "charger error" and "sensor error" in a 12-th status group. The standby status branches to statuses of "no fuse" and "dirty polygon mirror". The busy status does not have any branches.

A status in the second layer branches to statuses in a third layer. The "no paper" status in the 11-th status group branches to four statuses of "cassette 21" "cassette 22" "cassette 23" and "cassette 24" in a 111-th status group for identifying a cassette wherein no papers exist. It is assumed here that the cassette 25 as an option is not attached.

Similarly, the "no toners" status branches to statuses of "development unit 12" and "development unit 14" in a 112-th status group for identifying a development unit wherein no toners exist. The jam status branches to statuses of "first position", "second position" and "third position" in a 113-th status group for identifying a position at which a sheet of paper is detected. The open cover status branches to statuses of "first cover", "second cover" and "third cover" in a 114-th status group for identifying an opened cover.

Further, the "warn no toners" status in the 12-th status group branches to statuses of "development unit 12" and "development unit 14" in a 121-th status group for identifying a development unit for which there is no toner warning. The "component change" status branches to statuses of "first component", "second component" and "third component" in a 122-th status group for identifying a component on which a warning is given as to a change time for maintenance. The "motor error" status in the 13-group does not have any branches. The "charger error" status branches to statuses of "sensitizing charger 11" and "sensitizing charger 12" in a 132-th group for identifying a sensitizing charger on which an error is detected. The "sensor error" status does not have any branches. The "no fuse" status and the "dirty polygon mirror" status in the 14-th status group do not have any branches.

In the tree structure, it is to be noted that there is only one path from a status which does not have any branches to a status in the first layer. If a status which does not have any branches is changed, the other statuses along a path starting from that status are also changed successively.

There exist twelve status groups in the illustrated tree structure. Each status group may be stored as an array consisting of a plurality of bits. Each bit of the array corresponds to a status in the status group.

The memory 101 in the machine controller 100 stores all the statuses shown in FIG. 4. The machine controller 100 checks the sensors provided in the laser printer 1 during print operation. Each sensor corresponds to one status which does not have any branches.

Figure 5:
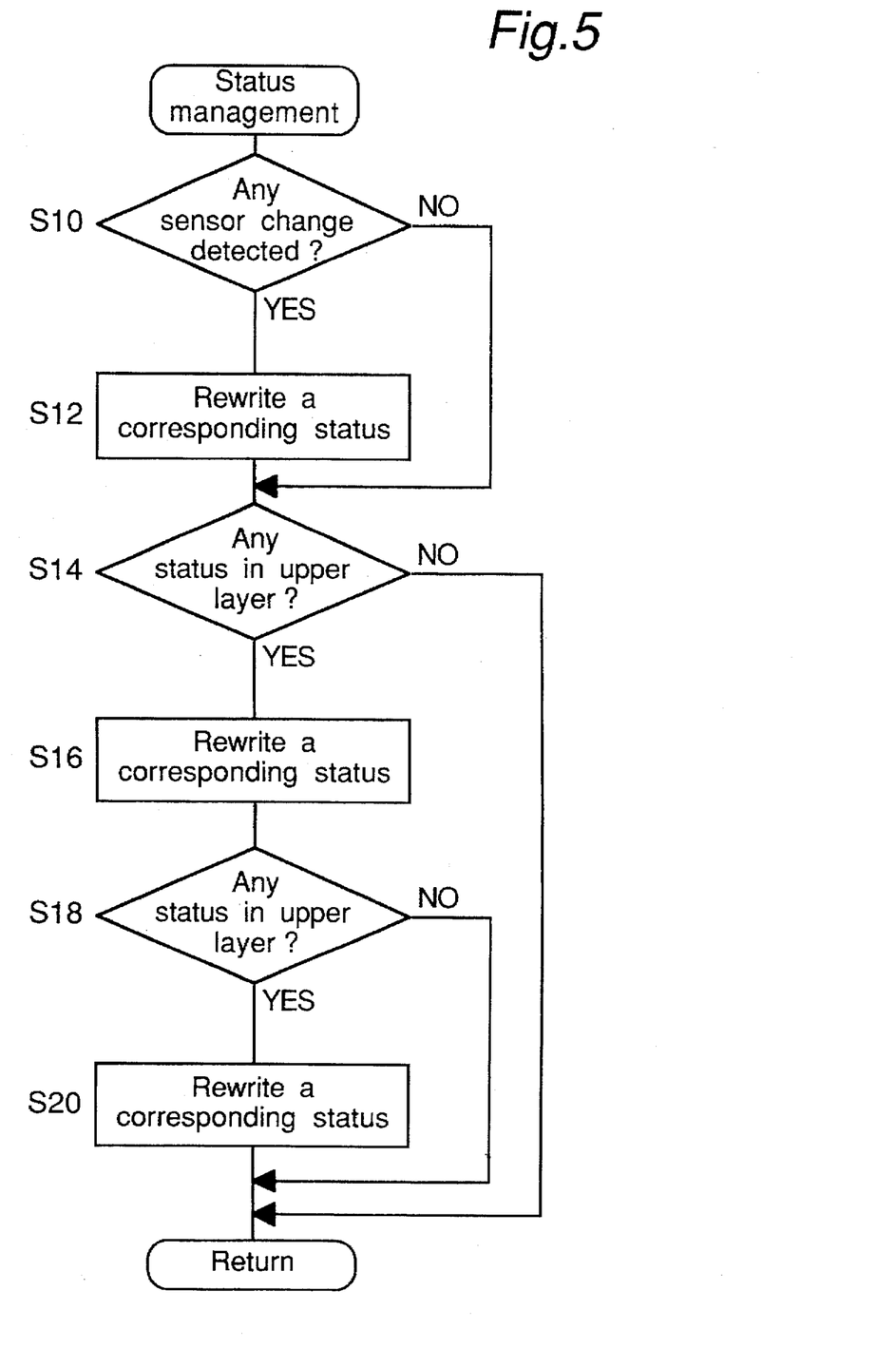
FIG. 5 is a flowchart of status management of a machine controller.

When an output signal of at least one sensor is detected to be changed, the machine controller 100 rewrites a status in the lowest layer in correspondence to the sensor and statuses in the upper layers which include the status in the lowest layer. FIG. 5 shows a flowchart of status management of the machine controller 100. First, it is checked at step S10 if a sensor output signal is changed or not. If the answer is YES at step S10, the status in correspondence to the sensor is rewritten at step S12. If, for example, a sensor SE1 provided at the first position in the laser printer 1 detects a jam, the "first position" status in the 113-th status group in the third layer is rewritten from "0" to "1" in the memory 101. Next, it is checked at step S14 if the rewritten status has a comprehensive status thereof in an upper layer or not. If the answer is YES at step S14, the comprehensive status in the upper layer in correspondence to the rewritten status is rewritten at step S16. In the above-mentioned example, the jam status in the 11-th status group in the second layer as a comprehensive status of the statuses in the 113-th status group is rewritten from "0" to "1". Otherwise, the flow returns to the main flow. Further, it is checked again at step S18 if the rewritten status has a comprehensive status thereof in an upper layer or not. If the answer is YES at step S18, the comprehensive status in the upper layer (or the first layer in this case) in correspondence to the rewritten status is rewritten at step S20. In the above-mentioned example, the error status in the first status group as a comprehensive status of the statuses in the 11-th status is rewritten from "0" to "1". Then, the flow returns to the main flow.

Figure 6:
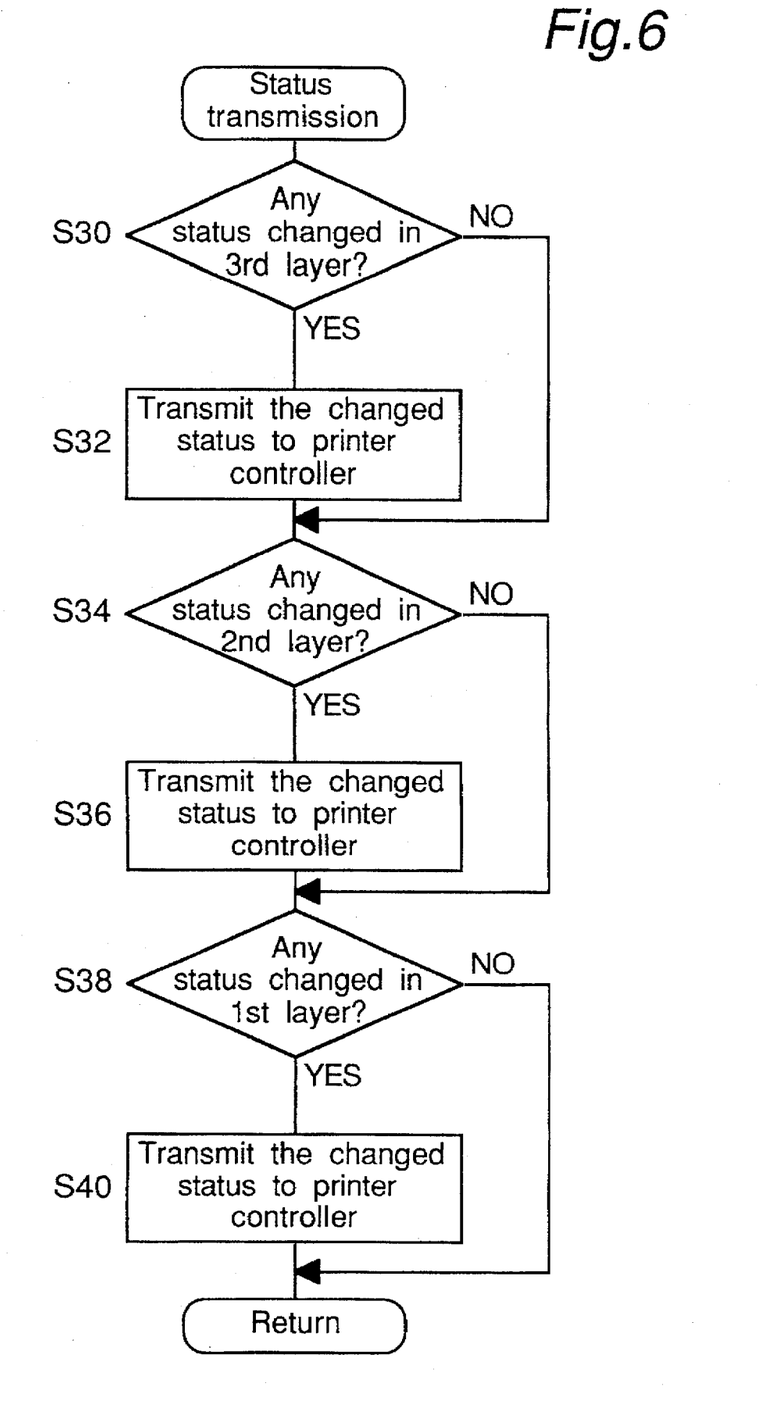
FIG. 6 is a flowchart of status transmission by the machine controller to the printer controller.

Information on re-written statuses is transmitted by the machine controller 100 through the control interface 202 to the printer controller 200. As shown in FIG. 6, the data transmission to the printer controller 200 is carried out as soon as a change of status signal is detected. Therefore, the printer controller 200 has updated data always.

FIG. 6 shows a flowchart of transmission to the printer controller 200 of status information by the machine controller 100. The transmission processing is performed in response to an interrupt request inputted from the printer controller 200 to the machine controller 100 while other control processings including the status management of FIG. 5 are performed by the machine controller 100. When the machine controller 100 receives the interrupt request from the printer controller 200 during the other processings such as the status management, the machine controller 100 interrupts the other processing and performs the transmission processing. In the transmission, information on the rewritten statuses is sent from a status in the lowest layer. First, it is checked at step S30 if any status in the status groups in the third layer is changed or not. If the answer is YES at step S30, the information of the rewritten status (for example, first position) is transmitted to the printer controller 200 at step S32. Next, it is checked at step S34 if any status in the status groups in the second layer is changed or not. If the answer is YES at step S34, the information of the rewritten status (for example, jam) is transmitted to the printer controller 200 at step S36. Further, it is checked at step S38 if any status in the first status group in the first layer is changed or not. If the answer is YES at step S38, the information of the rewritten status (for example, error) is transmitted to the printer controller 200 at step S40. Then, the flow returns to the main flow.

The printer controller 200 rewrites values of status signals according to the information transmitted by the machine controller 100. When the printer controller 200 rewrites a status in the first layer, it has already rewritten corresponding statuses in the second and third layer according to the order of the transmitted statuses. After the status of the first layer is rewritten, the printer controller 200 performs status verification in order to grasp the states of the laser printer 1. In the status verification processing, it is to be noted that information on the rewritten statuses is verified from statuses in the first layer for the efficiency of search. Because the machine controller 100 has transmitted status information from a status from the lowest order among the rewritten statuses, even if information on the rewritten statuses is verified from statuses in the first layer, the verification can be performed without error.

Figure 7:
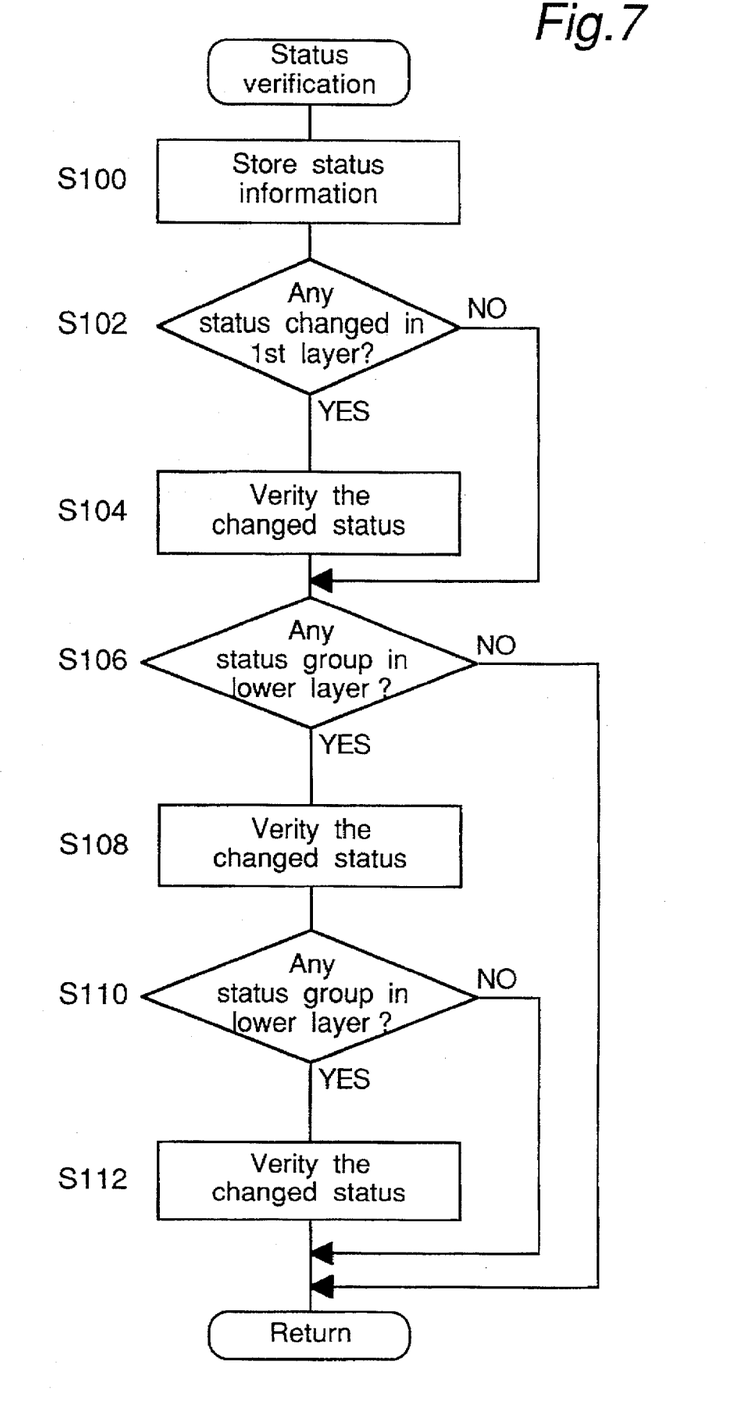
FIG. 7 is a flowchart of status verification by the printer controller.

FIG. 7 shows a flowchart of the status verification by the printer controller 200. First, status information transmitted from the machine controller 100 is stored in the memory 210. Then, it is checked at step S102 if any status in the first status group in the first layer is changed or not. If the answer is NO at step S102, the flow returns to the main flow readily. If the answer is YES at step S102, the rewritten status is verified at step S104. Next, it is checked at step S106 if the rewritten status has a status group belonging thereto in an lower layer or not. If the answer is YES at step S106, the rewritten status in the status group is verified at step S108. Further, it is checked again at step S110 if the rewritten status has a status group belonging thereto in a lower layer or not. If the answer is YES at step S110, the rewritten status in the status group is verified at step S112. Then, the flow returns to the main flow.

In the present embodiment, the printer controller is provided as a unit outside the printer. However, the printer controller may be provided inside the printer.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A status management method in a system including a controller and a peripheral connected to the controller, said peripheral being capable of managing states of the peripheral by using tree structure information, stored within said peripheral, of a plurality of statuses for representing states of said peripheral, said controller recognizing the states of said peripheral by receiving and storing the statuses from said peripheral as the tree structure information, the tree structure information having a first layer of statuses, at least one intermediate lower layer of statuses, and a lowest layer of statuses, wherein at least one status in the first layer of statuses branches successively from the first layer to statuses in at least one intermediate lower layer successively down to statuses in the lowest layer of statuses, and wherein statuses, which do not have any branches extending to a status in the lower layer, constitute statuses of the lowest order and correspond to states which can be detected by said peripheral; said method comprising:

when said peripheral detects a change of a state of said peripheral, the step of the peripheral rewriting a status stored in the peripheral which is a status of the lowest order in correspondence to the state in which the thus detected change of state occurred and then, if there is any branch connecting that status of the lowest order to any corresponding status in a higher layer of statuses, rewriting a status stored in the peripheral which represents a corresponding status in each such higher layer of statuses successively beginning with the corresponding status in the layer immediately above the layer containing the status of the lowest order corresponding to the state in which the thus detected change of state occurred; and the step of the peripheral transmitting the thus rewritten statuses to said controller successively in an order beginning with the thus changed status of the lowest order among the changed statuses and proceeding to the thus changed status in the first layer in the tree structure information.

2. The method according to claim 1, wherein the step of the peripheral transmitting is performed as soon as a status is rewritten in the step of the peripheral rewriting.

3. The method according to claim 1, further comprising the step of utilizing a sensor in said peripheral to detect a change of a state of said peripheral.

4. The method according to claim 1, further comprising a step performed by said controller of:

after receiving the rewritten statuses transmitted by said peripheral, verifying the rewritten statuses in an order beginning with the statuses in the first layer in the tree structure information and successively proceeding to statuses in the related lower layers in the tree structure information, if any.

5. The method according to claim 1, wherein said peripheral comprises a printer.

6. The method according to claim 1, further comprising the steps of:

the controller storing the tree structure information for said peripheral; and the controller rewriting each changed status on the tree structure information, stored by the controller, as each changed status is transmitted by said peripheral to said controller, so that when the controller rewrites a changed status in the first layer of the tree structure information stored by the controller, the controller has already rewritten any statuses in lower layers, corresponding to the changed status in the first layer, in accordance with the order of transmission of the changed statuses beginning with the lowest order among the changed statuses.

7. A method of status management in a system including a controller and a peripheral connected to the controller, comprising the steps of:

generating status information according to a change of a state generated in the peripheral by said peripheral, which status information has a plurality of layers, each of which layers having an array of signals with each signal including a plurality of bits, each of at least one of the bits of an array of an upper layer corresponding to an array in a lower layer to represent detail states of the bit in the upper layer;

transmitting the status information from the peripheral to said controller as a series of successive signals in an order beginning with the signals in the lowest layer and proceeding through successive layers to those in the highest layer;

storing in the controller the status information received from peripheral, beginning the storing with the thus transmitted signals in the lowest layer and proceeding with the storing of the signals in a successively higher layer, if any; and verifying changed statuses of said peripheral by said controller.

8. The method according to claim 7, wherein said peripheral comprises a sensor, and wherein the step of generating status information comprises the steps of:

detecting a change of a state from a change of an output signal of the sensor; and rewriting a bit of an array in the lowest layer in correspondence to the sensor and then successively rewriting a corresponding bit in each of the upper layers, if any.

9. The method according to claim 7, wherein the step of verifying changed statuses of said peripheral by said controller comprises:

a first step of checking to determine if any of the signals in the highest layer stored in the controller has changed, and if so, then verifying any changed signal in the highest layer stored in the controller;

a second step of checking to determine if any of the signals in the next lower layer stored in the controller has changed, and if so, then verifying any changed signal in the next lower layer stored in the controller; and repeating the second step until any changed signal in the lowest layer containing a changed signal has been verified.

10. A system including a controller and a peripheral connected to the controller, wherein said peripheral comprises:

a means for generating status information according to a change of a state generated by the peripheral itself, which status information has a plurality of layers including at least an uppermost layer and a lowermost layer, each of which layers has an array of signals with each signal including a plurality of bits, each of at least one bit in an array in an upper layer corresponding to an array in a lower layer to represent detail states of the bit in the upper layer; and a means for transmitting the thus generated status information from said peripheral to said controller in a successive order beginning with signals from the lowermost layer and then proceeding with signals in successively higher layers; and wherein said controller comprises a means for recognizing the states of said peripheral after receiving the thus transmitted status information.

11. The system according to claim 10, wherein said means for generating comprises sensors, a means in said peripheral for detecting a change of a state from a change of output signals of the sensors, and a means in said peripheral for rewriting a bit of an array in the lowest layer in correspondence to the sensor and for successively rewriting a bit in each of any higher layers.

12. The system according to claim 10, wherein said peripheral comprises a printer.

13. The system according to claim 11, wherein the controller stores the tree structure information for said peripheral; wherein the controller rewrites each changed status on the tree structure information, stored by the controller, as each changed status is transmitted by said peripheral to said controller, so that when the controller rewrites a changed status in the first layer of the tree structure information stored by the controller, it has already rewritten any statuses in lower layers, corresponding to the changed status in the first layer, in accordance with the order of transmission of the changed statuses beginning with the lowest order among the changed statuses.

14. The system according to claim 10, wherein the controller stores the tree structure information for said peripheral; wherein the controller rewrites each changed status on the tree structure information, stored by the controller, as each changed status is transmitted by said peripheral to said controller, so that when the controller rewrites a changed status in the first layer of the tree structure information stored by the controller, it has already rewritten any statuses in lower layers, corresponding to the changed status in the first layer, in accordance with the order of transmission of the changed statuses beginning with the lowest order among the changed statuses.

* * * * *